(12) United States Patent  
Parrini et al.

(10) Patent No.: US 12,520,964 B2  
(45) Date of Patent: Jan. 13, 2026

(54) STEAM PRODUCTION SYSTEM FOR PROFESSIONAL COFFEE MACHINES

(71) Applicant: SIMONELLI GROUP S.P.A., Belforte del Chienti (IT)

(72) Inventors: Mauro Parrini, San Ginesio (IT); Claudio Cingolani, Camerino (IT)

(73) Assignee: SIMONELLI GROUP S.P.A., Belforte del Chienti (IT)

( * ) Notice: Subject to any disclaimer, the term of this patent is extended or adjusted under 35 U.S.C. 154(b) by 1033 days.

(21) Appl. No.: 17/454,312

(22) Filed: Nov. 10, 2021

(65) Prior Publication Data

US 2022/0167780 A1 Jun. 2, 2022

(30) Foreign Application Priority Data

Dec. 2, 2020 (IT) .................... 102020000029465

(51) Int. Cl.
*A47J 31/44* (2006.01)
*A47J 31/00* (2006.01)

(52) U.S. Cl.
CPC ......... *A47J 31/4489* (2013.01); *A47J 31/007* (2013.01)

(58) Field of Classification Search
CPC ............................ A47J 31/4489; A47J 31/007
See application file for complete search history.

(56) References Cited

U.S. PATENT DOCUMENTS

| 2013/0112083 | A1* | 5/2013 | Douma | A47J 31/4489 |
| | | | | 99/453 |
| 2014/0069279 | A1* | 3/2014 | Upston | A47J 31/4403 |
| | | | | 99/283 |
| 2015/0110935 | A1* | 4/2015 | Prefontaine | A23F 5/262 |
| | | | | 426/433 |
| 2020/0229634 | A1* | 7/2020 | Cappellini | A47J 31/46 |

FOREIGN PATENT DOCUMENTS

| EP | 0 676 163 A1 | 10/1995 | |
| EP | 2 545 827 A1 | 1/2013 | |
| IT | MI20 100 359 A1 | 9/2011 | |
| WO | WO-2017068524 A1 * | 4/2017 | ............ A47J 31/007 |

OTHER PUBLICATIONS

Italian Search Report issued Jul. 15, 2021 in Italian Application 102020000029465 filed on Dec. 2, 2020, 3 pages (wtih English Translation of Categories of Cited Documents).

* cited by examiner

*Primary Examiner* — Elizabeth M Kerr
(74) *Attorney, Agent, or Firm* — Oblon, McClelland, Maier & Neustadt, L.L.P.

(57) ABSTRACT

A steam production system for professional coffee machines includes a nozzle; a boiler for producing steam in flow communication with a water source and the nozzle. The boiler is equipped with an independent heating device for the initial production of steam. The system further includes a heating assembly to instantaneously produce steam in flow communication with the boiler and/or the nozzle. The heating assembly includes an electric heating element; a heat (Continued)

exchanger associated with the electric heating element; and a water passage circuit associated with the heat exchanger which has an inlet joined to a water supply source or to a duct arriving from the latter and an outlet of the produced steam connected to the boiler and/or to the nozzle. The system also includes a programmable electronic unit operatively connected to the boiler and to the heating assembly to ensure the supply of steam to the nozzle.

8 Claims, 1 Drawing Sheet

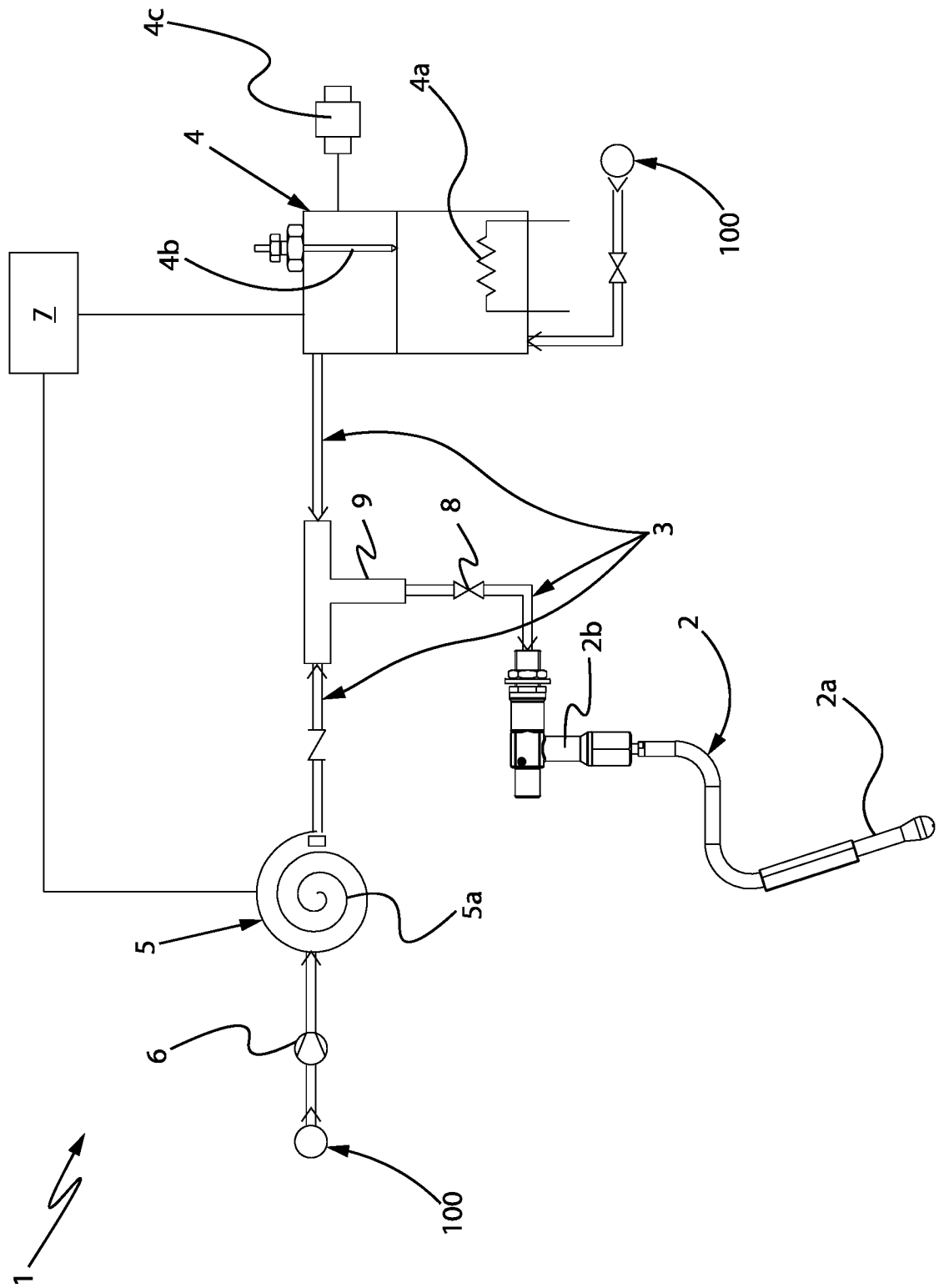

ately achieved by a steam production system for professional coffee machines, as described and claimed below.

STEAM PRODUCTION SYSTEM FOR PROFESSIONAL COFFEE MACHINES

The present invention relates to a steam production system for professional coffee machines.

The object of the present invention refers to the technical industrial sector of machines for dispensing coffee in general and, in particular, it is aimed at professional machines for dispensing coffee.

As is known, the technical sector of professional machines for dispensing coffee is gradually becoming aligned with the general needs of reducing energy consumption and increasing the overall performance of the machines that are produced and marketed.

With this in mind, various solutions have been implemented to improve the insulation of professional machines and minimise heat loss to the outside, as well as optimising the size and power of their internal components.

However, it should be noted that today's professional coffee dispensing machines have rather large and energy-intensive steam production and dispensing systems.

In detail, in order to guarantee instantaneous production of steam that can satisfy the immediate command given by the operator and/or the user in action, current professional coffee machines are equipped with large boilers with considerable energy consumption, for example around 14 litres for machines with two assemblies and around 21 litres for machines with three assemblies.

As well as having a significant impact on the overall energy consumption of the respective professional coffee machines, the large boilers have a significant impact on the overall dimensions of the respective machines, as well as on the space and internal arrangement of the related components.

The main object of the present invention is that of solving the problems encountered in the prior art.

An object of the present invention is to reduce the energy consumption of professional coffee machines attributable to large boilers for the production of instant steam by ensuring and improving the performance of such machines in relation to the instantaneous production of steam.

It is also an object of the present invention to reduce the overall dimensions of professional coffee machines while ensuring more internal space between the various components, as well as a better arrangement thereof.

The above-mentioned purposes and others are substantially achieved by a steam production system for professional coffee machines, as described and claimed below.

A description of a preferred but non-exclusive embodiment of a steam production system for professional coffee machines in accordance with the present invention is now disclosed by way of example.

BRIEF DESCRIPTION OF THE DRAWINGS

FIG. 1 shows a steam production system for professional coffee machines in accordance with an embodiment of the present invention.

The description will be carried out herein with reference to the sole FIG. 1, which is provided for illustrative purposes only and is therefore not limiting, in which a steam production system for professional coffee machines in accordance with the present invention is represented.

With reference to FIG. 1, the number 1 indicates overall a steam production system for professional coffee machines.

As can be seen in the schematic representation in FIG. 1, the steam dispensing system 1 comprises at least one dispensing nozzle 2 designed to expel steam on the action of a manual or electrical/electronic control.

The dispensing nozzle 2 is provided with an ejection nozzle 2a which is movably connected to a connection fitting 2b which is in turn connected to a steam supply line 3, schematically shown in FIG. 1.

Still with reference to FIG. 1, the steam dispensing system 1 comprises at least one boiler 4 for producing steam in flow communication with at least one water supply source 100, such as a common water supply or any other water supply source, and the dispensing nozzle 2. In detail, the boiler 4 for the production of steam is connected to the steam supply circuit 3 between the water supply source 100 and the steam dispensing nozzle 2.

The boiler 4 for producing steam is provided with at least one independent heating device 4a, preferably an electrical heating device, such as an electrical heating element, whose task is to ensure at least the initial production of steam.

As visible in the diagram of FIG. 1, the steam dispensing boiler 4 further comprises at least one level detector 4b and at least one pressure detector 4c for monitoring the water level and the pressure inside the boiler 4 respectively.

Advantageously, the boiler 4 for the production of steam has a total volume of not more than 1 litre, preferably not more than 0.8 litres.

Preferably, the boiler 4 for the production of steam has a maximum power not exceeding 1000 watts.

Still referring to the diagram of FIG. 1, the steam production system 1 comprises at least one heating assembly 5 for instantaneous production of steam in flow communication with the steam production boiler 4.

In detail, the heating assembly 5 for instantaneous production of steam is connected to the steam supply circuit 3 between the boiler 4 for the production of steam and a water supply source 100.

At least one supply pump 6, preferably a gear pump, is operatively interposed between the water supply source 100 and the heating unit 5 to direct water from the water supply source 100 to the latter.

The speed of the gear pump can be varied to vary the water and steam flow rate of the system 1.

Advantageously, the heating assembly 5 comprises at least one electrical heating element 5a, at least one heat exchanger (not illustrated in the accompanying figure) associated with the electrical heating element 5a, and at least one water transit circuit (also not illustrated in the accompanying figure) associated with the heat exchanger for producing instantaneous steam.

The water transit circuit of the heating unit 5 for the instantaneous production of steam has an inlet (not shown in the accompanying figure) which can be connected to a water supply source 100 or to a conduit coming from the latter and an outlet (also not shown) for the instantaneous steam produced, which can be connected to the boiler 4 for the production of steam by at least one branch of the steam supply circuit 3.

At least one non-return valve (not shown in the diagram in FIG. 1) may be operatively arranged between the heating assembly 5 for the instantaneous production of steam and the boiler 4 for the production of steam, which prevents the return of pressurized steam to the heating assembly 5.

The steam production system 1 further comprises at least one programmable electronic unit 7 operatively connected to the boiler 4 for the production of steam and to the heating assembly 5 for the instantaneous production of steam to ensure the supply of steam to the dispensing nozzle 2.

The programmable electronic unit 7 is configured to operate the heating device 4a of the boiler 4 for the production of steam and, subsequently, the electric heating element 5a of the heating assembly 5 for the instantaneous production of steam in such a way as to differentiate the production of steam which is therefore performed first by the boiler 4 and, after a predetermined period of time, by the heating assembly 5.

The boiler 4 for producing steam acts as a reservoir for the first few seconds of steam dispensing.

Steam from both the boiler 4 for the production of steam and from the heating assembly 5 for the instantaneous production of steam flows outwards through a solenoid valve 8 which is located upstream of the respective dispensing nozzle 2.

According to a preferred embodiment, not represented in the diagram of FIG. 1, the boiler 4 for the production of steam and the heating unit 5 for the instantaneous production of steam are arranged in parallel and are connected by at least one three-way connection 9, preferably a "T" or "Y" fitting or by at least one three-way mixing valve which regulates the flows in the two inlet ways according to the different pressure or flow rate.

According to this embodiment, the boiler 4 for the production of steam and the heating assembly 5 for the instantaneous production of steam can be independently supplied by the same water supply source 100 or from different water supply sources 100.

Both the boiler 4 for the production of steam and the heating assembly 5 for the instantaneous production of steam convey the steam produced to the solenoid valve 8 associated with the dispensing nozzle 2 via the connection 9 or the three-way mixing valve.

The three-way mixing valve can be of the passive type, e.g. a shape memory valve, or of the active type, e.g. a proportional or motorized solenoid valve.

The programmable electronic unit 7 is also configured to deactivate the heating device 4a of the boiler 4 for the production of steam when the heating assembly 5 for the instantaneous production of steam starts to generate steam or when the solenoid valve 8 associated with the dispensing nozzle 2 is activated.

The programmable electronic unit 7 is also configured to keep the heating device 4a of the boiler 4 for the production of steam and the electric heating element 5a of the heating unit 5 for the instantaneous production of steam simultaneously in action to increase the production of steam.

The steam generation system solves the problems encountered in known technology and achieves important advantages.

Firstly, the interaction between the boiler for the production of steam and the heating assembly for the instantaneous production of steam ensures immediate steam production that can respond instantly to any steam dispensing request while reducing the overall energy consumption of the system and, consequently, of the associated professional coffee machine.

In addition, the system thus conceived makes it possible to significantly reduce the volume of the boiler used to produce steam, thereby reducing the overall dimensions of the professional coffee machine.

It should also be noted that the reduction in the overall dimensions of the boiler for the production of steam allows for the recovery of space inside the coffee machine, which makes it easier for manufacturers to arrange the components inside the machine.

The invention claimed is:

1. A steam production system for professional coffee machines comprising:
    a dispensing nozzle;
    a boiler for producing steam in flow communication with at least a water supply source, said source not being part of the system, and the dispensing nozzle, the boiler for producing steam being provided with at least an autonomous heating device for the initial production of steam;
    a heating assembly for instantaneous production of steam in flow communication with the steam production boiler and/or with the dispensing nozzle, the heating assembly comprising at least a heating electric element, at least a heat exchanger associated to the electric heating element and at least a circuit for the passage of water associated to the heat exchanger for producing steam, the water passage circuit having an inlet that can be joined to a water supply source or to a duct arriving from the latter and an outlet of the produced steam connected to the boiler and/or to the dispensing nozzle for producing steam; and
    a programmable electronic unit operatively connected to the boiler for producing steam and to the heating assembly for ensuring the supply of steam to the dispensing nozzle,
    wherein the programmable electronic unit is configured to operate the heating element of the boiler for producing steam and, later then, the electric heating element of the heating assembly, and
    wherein steam produced by the boiler and steam produced by the heating assembly are both configured to be dispensed by the dispensing nozzle.

2. The steam production system according to claim 1, wherein the boiler for steam production has a maximum power not exceeding 1000 watts.

3. The steam production system according to claim 1, wherein the boiler has a total volume of not more than 1 litre.

4. The steam production system according to claim 1, wherein the programmable electronic unit is configured to deactivate the heating device of the boiler for the production of steam when the heating assembly generates steam.

5. The steam production system according to claim 1, wherein the programmable electronic unit is configured to maintain the heating device of the boiler for the production of steam and the electric heating element of the heating assembly simultaneously in action.

6. The steam generation system according to claim 1, wherein the boiler for steam generation and the heating assembly are arranged in parallel and are connected by at least one three-way connection.

7. The system according to claim 6, wherein the three-way mixing valve further comprises a mixing valve of the passive type.

8. The system according to claim 6, wherein the three-way mixing valve further comprises a mixing valve of the active type.

* * * * *